(12) United States Patent  
Xu et al.

(10) Patent No.: US 11,733,210 B2  
(45) Date of Patent: Aug. 22, 2023

(54) ULTRASONIC DETECTION AND TENSILE CALIBRATION TEST METHOD FOR BONDING STRENGTH GRADE

(71) Applicant: BEIJING INSTITUTE OF TECHNOLOGY, Beijing (CN)

(72) Inventors: Chunguang Xu, Beijing (CN); Lei He, Beijing (CN); Dingguo Xiao, Beijing (CN); Qiutao Wang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 203 days.

(21) Appl. No.: 17/365,264

(22) Filed: Jul. 1, 2021

(65) Prior Publication Data

US 2022/0003719 A1  Jan. 6, 2022

(30) Foreign Application Priority Data

Jul. 3, 2020 (CN) .......................... 202010637122.7

(51) Int. Cl.
*G01N 29/06* (2006.01)
*G01N 29/09* (2006.01)
*G01N 29/34* (2006.01)

(52) U.S. Cl.
CPC ......... *G01N 29/0645* (2013.01); *G01N 29/09* (2013.01); *G01N 29/34* (2013.01);
(Continued)

(58) Field of Classification Search
CPC ....... G01N 29/0645; G01N 2291/0237; G01N 2291/02827; G01N 2291/044; G01N 29/09; G01N 29/34; G01N 2291/048
(Continued)

(56) References Cited

U.S. PATENT DOCUMENTS 4,215,583 A * 8/1980 Botsco ............... G01N 29/0618  
73/582  
4,979,394 A * 12/1990 Higo ...................... G01N 29/12  
73/602

(Continued)

FOREIGN PATENT DOCUMENTS

CN          1068891 A   *  2/1993  
CN        102087203 A      6/2011  
(Continued)

*Primary Examiner* — Lisa M Caputo  
*Assistant Examiner* — Rose M Miller  
(74) *Attorney, Agent, or Firm* — John A. Miller; Shumaker, Loop & Kendrick

(57) ABSTRACT

An ultrasonic detection and tensile calibration test method for bonding strength grade comprising bonding an upper substrate block to bonding groove(s) to form a theoretical bonding area, and applying a downward actual tensile force to a lower substrate block; obtaining an actual bonding area of the theoretical bonding area; calculating a first actual bonding strength by using the actual tensile force and the actual bonding area, and comparing the first actual bonding strength with a second actual bonding strength calculated to verify the correctness of the theoretical bonding area as a calibrated bonding strength; forming a bond strength table in which the theoretical bonding areas, the actual bonding areas and the first actual bonding strengths are in one-to-one correspondence; and using the actual bonding area to find the actual bonding strength corresponding to the actual bonding area from the bonding area bonding strength table.

6 Claims, 7 Drawing Sheets grade 0    grade 1    grade 2    grade 3    grade 4 grade 5    grade 6    grade 7    grade 8    grade 9

(52) U.S. Cl.
CPC ............. *G01N 2291/0237* (2013.01); *G01N 2291/02827* (2013.01); *G01N 2291/044* (2013.01); *G01N 2291/048* (2013.01)

(58) Field of Classification Search
USPC .......................................................... 73/588
See application file for complete search history.

(56) References Cited

U.S. PATENT DOCUMENTS

| | | | | |
|---|---|---|---|---|
| 5,631,424 | A | * | 5/1997 | Nieters .................. G01N 29/40 73/598 |
| 6,394,586 | B2 | * | 5/2002 | Isshiki ................ B41J 2/14314 347/54 |
| 7,446,406 | B2 | | 11/2008 | Mizuno et al. |
| 8,342,017 | B1 | * | 1/2013 | Bossi ..................... G01N 19/04 73/150 A |
| 9,103,758 | B1 | * | 8/2015 | Frisch ..................... G01N 19/04 |
| 2014/0326778 | A1 | | 11/2014 | Lee |

FOREIGN PATENT DOCUMENTS

| | | | |
|---|---|---|---|
| CN | 102854133 | A | 1/2013 |
| CN | 103528885 | A | 1/2014 |
| CN | 103743671 | A | 4/2014 |
| CN | 105628610 | A | 6/2016 |
| CN | 107554812 | A | 1/2018 |
| CN | 108956452 | A | 12/2018 |
| CN | 109554007 | A | 4/2019 |
| CN | 109883947 | A | 6/2019 |
| CN | 109975205 | A | 7/2019 |
| CN | 110031398 | A | 7/2019 |
| CN | 111257219 | A | 6/2020 |
| CN | 111272650 | A | 6/2020 |
| EP | 2251182 | B1 | 1/2012 |
| JP | WO2005004216 | A1 * | 8/2006 ............. H01L 21/78 |
| JP | 2014049629 | A * | 3/2014 |
| WO | WO-8809502 | A2 * | 12/1988 |

* cited by examiner

ULTRASONIC DETECTION AND TENSILE CALIBRATION TEST METHOD FOR BONDING STRENGTH GRADE

CROSS-REFERENCE TO RELATED APPLICATIONS

This application claims priority to China Patent Application Serial No. 202010637122.7 filed Jul. 3, 2020, the entire disclosure of which is herein incorporated by reference.

BACKGROUND

Field

The present disclosure relates to the technical field of ultrasonic nondestructive testing, and in particular to an ultrasonic testing and tensile calibration testing method for bonding strength grade.

Discussion of the Related Art

The surface coating technology relates a technology in that on the basis of understanding failure mechanisms of the surfaces of various metal parts and characteristics of various metal materials, the parts are endowed with high temperature resistance, wear resistance, corrosion resistance, oxidation resistance, fatigue resistance and other required performances so as to improve the performance of the substrate material, improve the reliability of the parts and prolong the service life. The damaged parts can be protected or repaired by using the surface coating technology of surface metallurgy strengthening or surface coating strengthening.

The development and application of various coatings and surface coating technologies put forward higher and higher requirements on the reliability and the reliability of the coatings, and the performance detection of the coatings directly influences the surface coating technology, particularly the application and popularization in the environments of heat resistance, wear resistance, corrosion resistance, different stress conditions and the like. Failure of the coating during use will cause significant damage and dramatic loss. Therefore, in order to make more effective use of the coating technology and to avoid or reduce the damage and loss of the substrate due to its failure, the detection and evaluation of the coating performance is of great importance. The detection and evaluation of the performance of the coating in the production and service mainly includes the characterization of coating for the thickness, density, elastic modulus, corrosion resistance, wear resistance and the like, evaluation of the adhesion quality of the coating, and the detection of defects in the coating for size, orientation, type and the likes. Among these performance parameters, whether the characteristic parameters of the bonding strength of the coating interface meet the requirements or not is often a significant factor influenced on the performance and service life of the coating material.

A large amount of data prove that the failure of the coating is mainly caused by insufficient bonding strength of the coating and a substrate. For example, in the case of the thermal barrier coating, a TGO (Thermally Grown Oxide) layer grows between the adhesive layer and the ceramic layer in the high-temperature thermal cycle working process, and causes defects at the interface, resulting in the local delamination of the substrate. And in the case of the radar-absorbing coating for aircraft, the coating falls off in the using process due to its insufficient bonding strength with the aluminum alloy substrate, affecting the stealth performance of the aircraft. Therefore, it is very important to detect the bonding strength of the coating at the interface. However, since the bonding strength of the coating is a structural parameter and is not the physical property of the material, it has many influencing factors and complex models, which are inconvenient for measuring the bonding strength of the parts in service.

The patent with an application number of CN91105192.9, titled "Method for Testing Metal and Nonmetal Binding by Ultrasonic scanning", discloses an ultrasonic scanning online detection method for metal and nonmetal bonding, in which ultrasonic transverse waves are reflected on the bonding surface for multiple times, so as to detect the bonding state of metal and nonmetal according to different attenuation of reflection echo signals caused by different bonding states. The method is characterized in that: the transverse waves are reflected and scanned for many times on the metal and nonmetal adhesive surface in a W-shaped transmission mode on the section of the adhesive surface between the probe and the end surface of the metal piece or between two inclined probes, so that the adhesion information of the whole transverse wave scanning area can be obtained by one-time detection. This method is different from the method according to the present disclosure, in which the doped substrate block with nine equal parts of the expansion strength is used to realize the methods of the ultrasonic testing of the bonding strength of the coating and the adhesive layer, the calibration of the bonding strength grade, and the classification and evaluation of the bonding strength grade. The other patent with the application number of CN201610207616.5, titled "Integration Equipment and Detection Method for Evaluating Coating Bonding Strength Substrated on Interface Fracture Toughness", discloses in that the quantitative detection of all parameters of an interface fracture toughness formula is completed in a set of equipment through the ultrasonic nondestructive measurement of the elastic modulus of the coating and a substrate and the continuous pressing-in test of the coating-substrate interface, so that the critical load of the cracking of the coating-substrate interface and the corresponding interface fracture toughness are obtained. The method utilizes two parameters of interfacial fracture toughness to represent the bonding strength value of the coating, and needs to consider the thickness factor, straight line fitting and the like of the coating.

SUMMARY

In view of this, the main objective of the present disclosure is to provide an ultrasonic testing and tensile calibration method for bonding strength grade, which is used to calibrate the bonding strength of some workpieces that are inconvenient to be tested.

The calibration test method of the present disclosure comprises the following steps:

a step 1 of arranging an upper substrate block and a lower substrate block on a tensile testing machine respectively, wherein the upper substrate block is fixedly arranged, and an upper surface of the lower substrate block is provided with nine bonding grooves of the same area;

a step 2 of bonding the upper substrate block to the bonding groove(s) to form a theoretical bonding area $s_{iv}$, and a downward actual tensile force is applied to the lower substrate block;

a step 3 of scanning an actual bonding area $s_{sj}$ of the theoretical bonding area by using an ultrasonic scanning method;

a step 4 of calculating a first actual bonding strength $\sigma_{sj1}$ by using the actual tensile force in the step 2 and the actual bonding area $s_{sj}$ in the step 3, and the first actual bonding strength $\sigma_{sj1}$ is compared with a second actual bonding strength $\sigma_{sj2}$ calculated by an equation to verify the correctness of a method that uses the theoretical bonding area as a calibrated bonding strength;

a step 5 of repeating the steps 2 to 4 multiple times to form a bond strength table in which the theoretical bonding areas, the actual bonding areas and the first actual bonding strengths are in one-to-one correspondence, wherein the theoretical bonding area $s_{lv}$ and the actual tensile force in each of the multiple times are different from those in other times;

a step 6 of performing a C-scan on an adhesive layer of a workpiece made of the same material of which bonding strength needs to measure to obtain the actual bonding area of the workpiece, and the actual bonding strength corresponding to the actual bonding area is retrieved from the bonding strength table.

In this way, the actual bonding strengths of nine different theoretical bonding areas (representing different bonding strengths) of a material under different tensile forces are obtained through experiments in advance, then a bond strength table where the theoretical bonding areas, the actual bonding areas and the first actual bonding strengths are in one-to-one correspondence is formed. When a workpiece of the same material needs to be calibrated, the actual bonding area of the workpiece is obtained by a C-scan, the actual bonding strength corresponding to the actual bonding area of the workpiece is retrieved through searching the bonding area bonding strength table, the actual bonding strength of the workpiece is obtained without additionally performing a tensile test. The method has practical significance, particularly for workpieces which are inconvenient to perform the tensile test, not only saves the cost, but also meets the engineering requirements.

Preferably, the formula for calculating the second actual bonding strength $\sigma_{sj2}$ in the step 4 is:

$$\sigma_{sj2} = \sigma_{th} \cdot \frac{\frac{Z_2 - Z_1}{Z_1 + Z_2} \cdot s_{sj}}{s_{lv}},$$

where $Z_1$ and $Z_2$ are acoustic impedances of coating and the adhesive layer respectively, $\sigma_{th}$ is a theoretical bonding strength of the upper substrate block (2) that is generally obtained by a tensile testing and is set as a minimum value of $\sigma_{min}$ in the testing.

Preferably, wherein verifying the correctness of the method that uses the theoretical bonding area as the calibrated bonding strength in the step 3 comprises verifying whether $$\sigma_{sj1} > \sigma_{sj2} = \sigma_{min} \cdot \frac{\frac{Z_2 - Z_1}{Z_1 + Z_2} \cdot s_{sj}}{s_{lv}}$$

is within an allowable range.

Preferably, the bonding grooves are nine quadrate or annular grooves of the same area, the quadrate grooves are combined together to form a large quadrate nine-square grid, and the annular grooves are sequentially concentrically arranged from inside to outside to have a nine-ring form.

Preferably, the theoretical bonding areas of grades of the nine-square grid in the step 2 are symmetrical about a center of the nine-square grid.

In this way, the theoretical bonding areas of grades of the nine-square grid are symmetrical about the center of the nine-square grid, so that the tensile testing machine stretches downwards about the center of the theoretical bonding area during the tensile testing, otherwise, the accuracy of the results of the tensile testing cannot be ensured.

Preferably, arranging the upper and lower substrate blocks on the tensile testing machine respectively in the step 1 comprises arranging the upper and lower substrate blocks on upper and lower stretching rods of the tensile testing machine respectively, where the upper stretching rod (1) is fixedly arranged.

NUMERAL SIGNS 1 upper loading block; 2 upper substrate block; 3 lower substrate block; 4 lower loading block; 31 annular groove; 32 bolt; 33 quadrate groove.

DETAILED DESCRIPTION OF THE EMBODIMENTS

The present disclosure relates to an ultrasonic detection and tensile calibration test method of bonding strength grades, which utilizes nine-grade bonding strength to bond a substrate block so as to detect the nine grades of bonding strength of the substrate block and an adhesive layer, and evaluates bonding strengths of other adhesive layers and the same material by taking the detected nine grades of bonding strength as a standard.

The present disclosure designs and manufactures upper and lower substrate blocks with different bonding strengths, and researches and experimental verification show that the method has correct theoretical basis, feasible technical scheme, effective implementations and reliable and repeatable detection results, and meets the requirements of ultrasonic detection and strength grade calibration of the bonding strength of coatings and other bonding pieces.

The ultrasonic detection and tensile calibration test method for bonding strength grade can meet the requirements of ultrasonic detection, grade calibration and grade classification evaluation of the bonding strength of a coating and a substrate and the bonding strengths at interfaces, wherein the substrate and a bonding piece can be made of aluminum alloy, low-carbon steel, composite materials, non-metal materials and the like, and the coating and the bonding material can be made of chemical adhesives, metal or non-mental materials for hot-melt spraying, welding melting and the like. The method can be widely applied to the fields of mechanical manufacturing, aerospace, information technology, microelectronic technology, bioengineering and the like.

Figure 1:
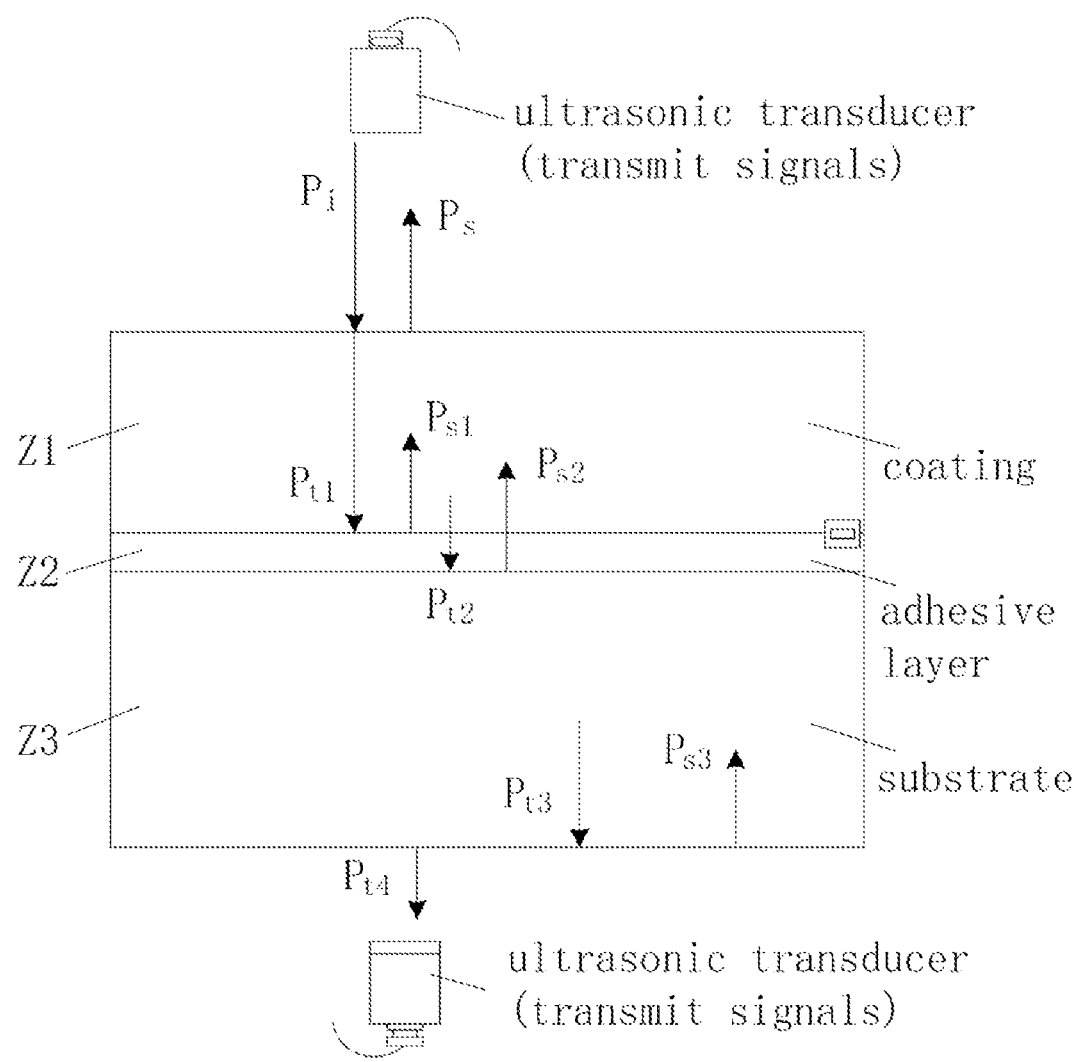
FIG. 1 is a schematic representation of signals from an ultrasonic transducer traveling through a coating, an adhesive layer, and a substrate.
Figure 2:
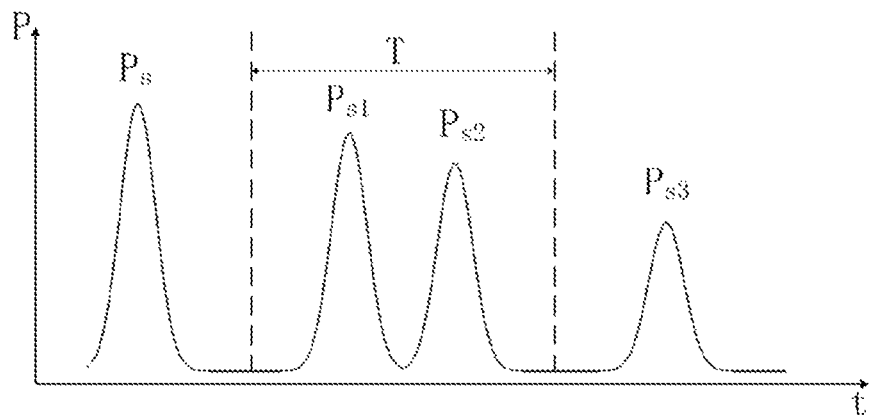
FIG. 2 is a schematic illustration of the reflection of signals from an ultrasonic transducer through a coating, an adhesive layer, and a substrate.
Figure 3:
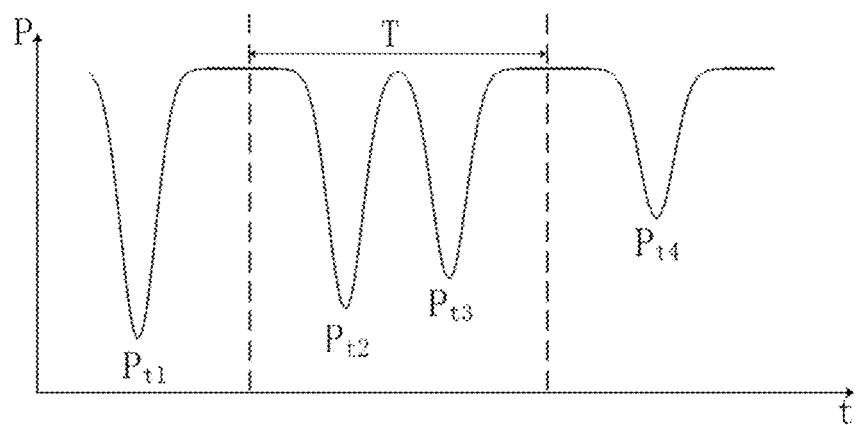
FIG. 3 is a schematic representation of the transmission of signals form an ultrasonic transducer through a coating, an adhesive layer, and a substrate.

As shown in FIGS. 1 to 3, $Z_1$, $Z_2$, $Z_3$ are acoustic impedances of materials of the coating, the adhesive layer, and the substrate, $P_{ti}$ (i=1~4) are pulse signals transmitted through the coating, adhesive layer, substrate, and coupling medium (water) respectively, and $P_{si}$ (i=1~3) are pulse signals reflected by the coating, adhesive layer, and substrate respectively. When the pulse-echo method is adopted for detection, in case where the coating is intact, after ultrasonic waves respectively penetrate through the coating and the adhesive layer and enter the substrate, the energy of a substrate bottom wave reflection echo signal $P_{s3}$ is large, reflectivity of a bonding interface $P_{s2}$ is low, and transmissivity is high; in case where the coating is completely peeled off or not bonded, ultrasonic energy is completely reflected by a debonding coating interface to form a coating bottom wave reflection echo, the energy reflectivity of the bonding interface of the coatings is high and transmissivity is low; in case where the coating is imperfect or in weak bonding, a certain degree of reflection echo and transmission echo exist at the interface of the coating and the substrate. In summary, the higher the transmission of ultrasonic energy, the better the bonding state, the higher the bonding strength, and vice versa; therefore, the coating bonding strength can be obtained by detecting the amplitude or energy of the coating echo, the substrate echo and the bonding interface echo.

When the bonding strength standard measurement is performed, the equation for the coating bonding strength σ is Eq.1.

$$\sigma = \sigma_{th} \cdot K_r \text{ Or } \sigma = \sigma_{th} \cdot K_t, \tag{1}$$

where σ is the bonding strength in units of N/m² or Pa and $\sigma_{th}$ is the theoretical bonding strength of the coating, as determined by tensile testing, in units of N/m² or Pa.

$K_r$ is the bonding strength coefficient of ultrasonic reflection method that is the ratio of the reflection coefficient to the total reflection coefficient $r_{Sth}$ of ultrasonic reflection scan, and is calculated by the following Eq.2.

$$K_r = \frac{\oint r_{s1} dS + \oint r_{s2} dS}{\oint r_{Sth} dS} \tag{2}$$

$K_t$ is the intensity coefficient of ultrasonic transmission method that is the ratio of the transmission coefficient to the total transmission coefficient $t_{Tth}$ of ultrasonic transmission scan, and is obtained by the following Eq.3.

$$K_t = \frac{\oint t_{t1} dS + \oint t_{t2} dS}{\oint t_{Tth} dS} \tag{3}$$

The energy reflection coefficient of ultrasonic energy at the interface of the coating and the adhesive layer is obtained by Eq.4.

$$r_{s1} = \frac{P_{s1}}{P_{t1}} = \frac{Z_2 - Z_1}{Z_1 + Z_2} \tag{4}$$

The energy reflection coefficient of ultrasonic energy at the interface of the adhesive layer and the substrate is obtained by Eq.5.

$$r_{s2} = \frac{P_{s2}}{P_{t2}} = \frac{Z_3 - Z_2}{Z_2 + Z_3} \tag{5}$$

The energy transmission coefficient of ultrasonic energy at the interface of the coating and adhesive layer is obtained by Eq.6.

$$t_{t1} = \frac{P_{t2}}{P_{t1}} = \frac{2Z_2}{Z_1 + Z_2} \tag{6}$$

The energy transmission coefficient of ultrasonic energy at interface of the adhesive layer and the substrate is obtained by Eq.7.

$$t_{t2} = \frac{P_{t3}}{P_{t2}} = \frac{2Z_3}{Z_2 + Z_3} \tag{7}$$

$Z_1$, $Z_2$, $Z_3$ are the acoustic impedances of the materials of the coating, the adhesive layer and the substrate, respectively.

Both the total reflection coefficient $r_{Sth}$ and the total transmission coefficient $t_{Tth}$ are 1 generally, therefore:

when measured by the reflection method, the bonding between the coating and the substrate is obtained by Eq.8.

$$\sigma = \sigma_{th} \cdot K_r = N/s \cdot \frac{\oint r_{s1} ds + \oint r_{s2} ds}{s} = N/s \cdot \frac{\oint \frac{Z_2 - Z_1}{Z_1 + Z_2} ds + \oint \frac{Z_3 - Z_2}{Z_2 + Z_3} ds}{s}, \tag{8}$$

when measured by the transmission method, the bonding strength between the coating and the substrate is obtained by Eq.9.

$$\sigma = \qquad (9)$$

$$\sigma_{th} \cdot K_t = N/s \cdot \frac{\oint t_{t1} ds + \oint t_{t2} ds}{s} = N/s \cdot \frac{\oint \frac{2Z_2}{Z_1+Z_2} ds + \oint \frac{2Z_3}{Z_2+Z_3} ds}{s}$$

s is the bonding area, N is the tensile force applied during the tensile test. The method of measuring the theoretical bonding strength $\sigma_{th}$ is described below.

The theoretical bonding strength $\sigma_{th}$ can be determined experimentally. Different coating bonding areas and coating materials have different bonding strengths. In order to obtain specific value of the bonding strength of each coating structure, standard bonding strength substrate blocks with different coating structures need to be prepared, different specimens are stretched by a tensile testing machine to obtain different bonding strengths, and a detection instrument needs to be calibrated before the bonding strength $\sigma_{th}$ of the coatings is detected.

Figure 4:
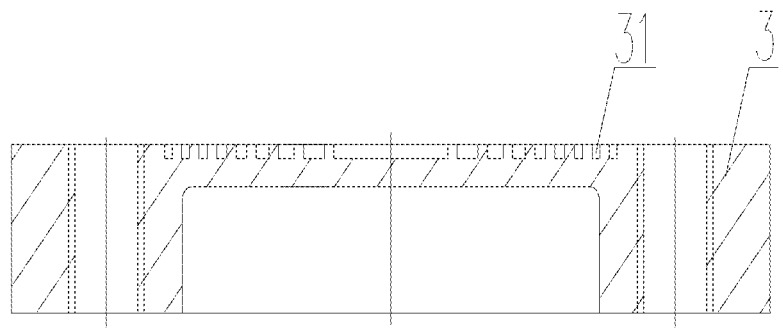
FIG. 4 is a front cross-sectional view of a lower substrate block.
Figure 5:
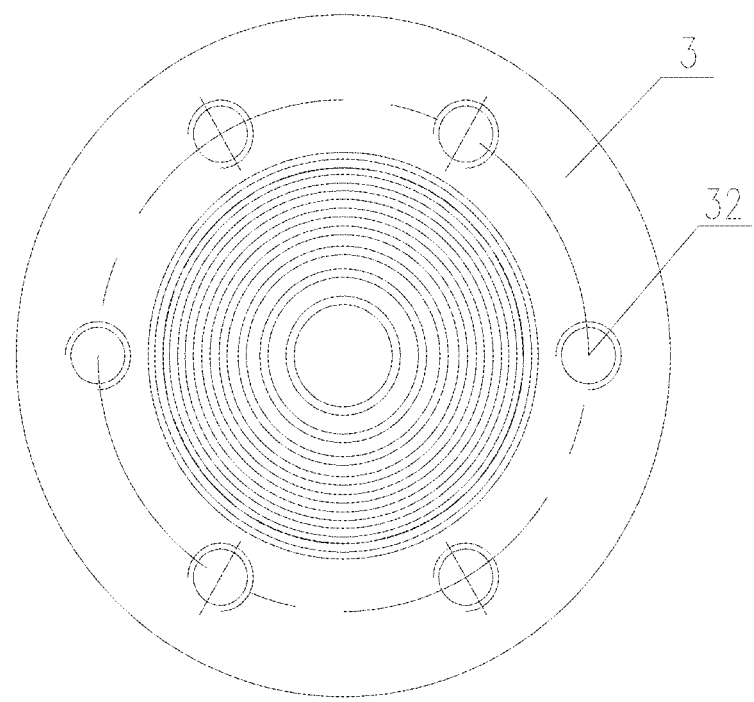
FIG. 5 is a top view of a lower substrate block.
Figure 6:
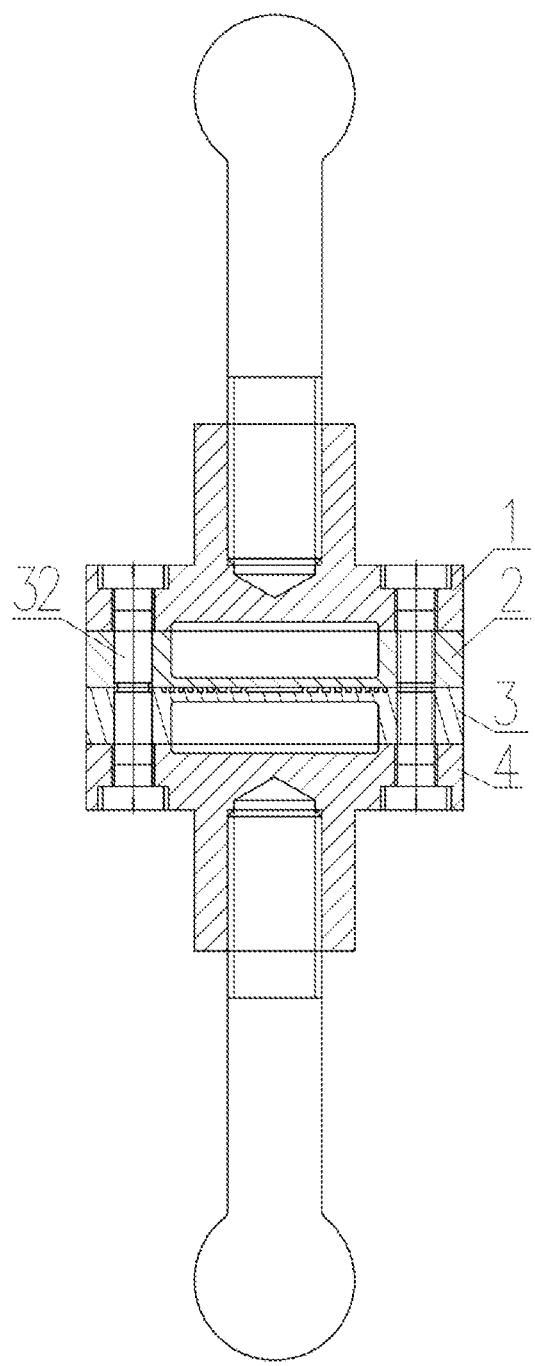
FIG. 6 is a schematic view of installation of nine-ring upper and lower substrate blocks on a tensile testing machine.

As shown in FIGS. 4 to 6, an upper substrate block 2 and a lower substrate block 3 are provided in up and down manner. Nine concentric annular grooves 31 are arranged on the upper surface of the lower substrate block 3 in such a manner that they are sequentially and concentrically arranged from inside to outside to form a nine-ring form. Adhesive material is provided in the annular grooves 31 for bonding the lower surface of the upper substrate block 2 and the upper surface of the lower substrate block 3. The upper and lower substrate blocks are bonded by the adhesive material. An upper loading block 1 fixedly connected to the upper base block 2 is provided, and a lower loading block 4 fixedly connected to the lower base block 3 is also provided, then the upper loading block and the lower loading block are respectively arranged on an upper stretching rod and a lower stretching rod of a tensile testing machine. The upper loading block 1 is fixedly arranged, and the lower substrate block 3 is pulled downwards by certain tensile force from the tensile testing machine via the lower loading block 4. When the areas of the coatings are different and the materials of the coatings are different, the applied tensile forces are different, and the bonding strengths of the coatings obtained by the ratio of the tensile forces to the areas of the coatings are different.

Figure 7:
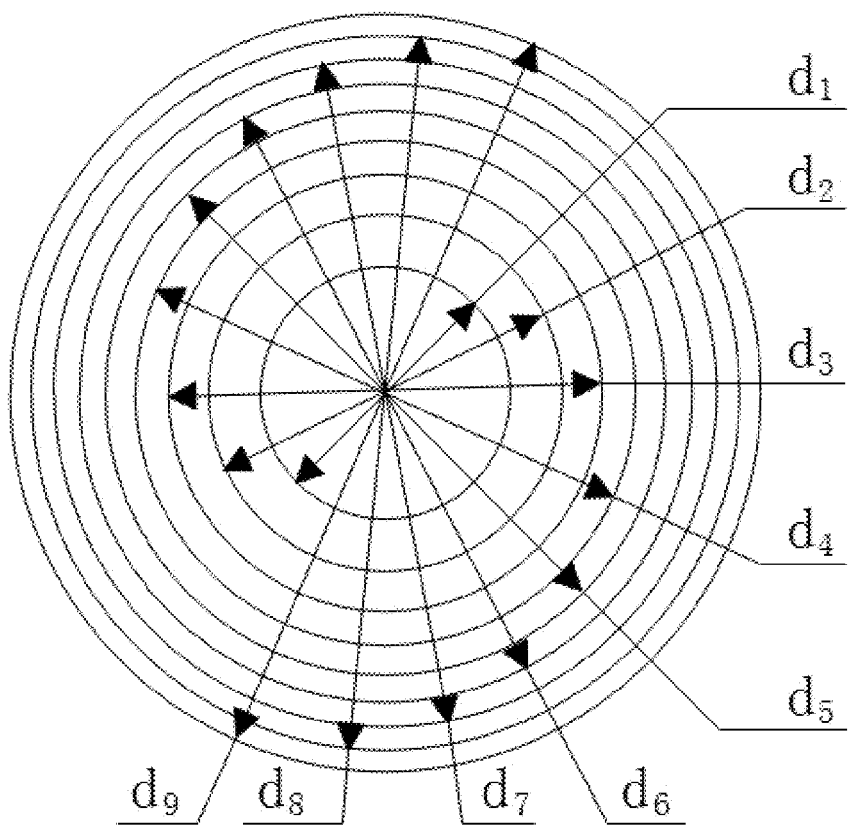
FIG. 7 is a schematic diagram illustrating nine-ring bonding grades.
Figure 8:
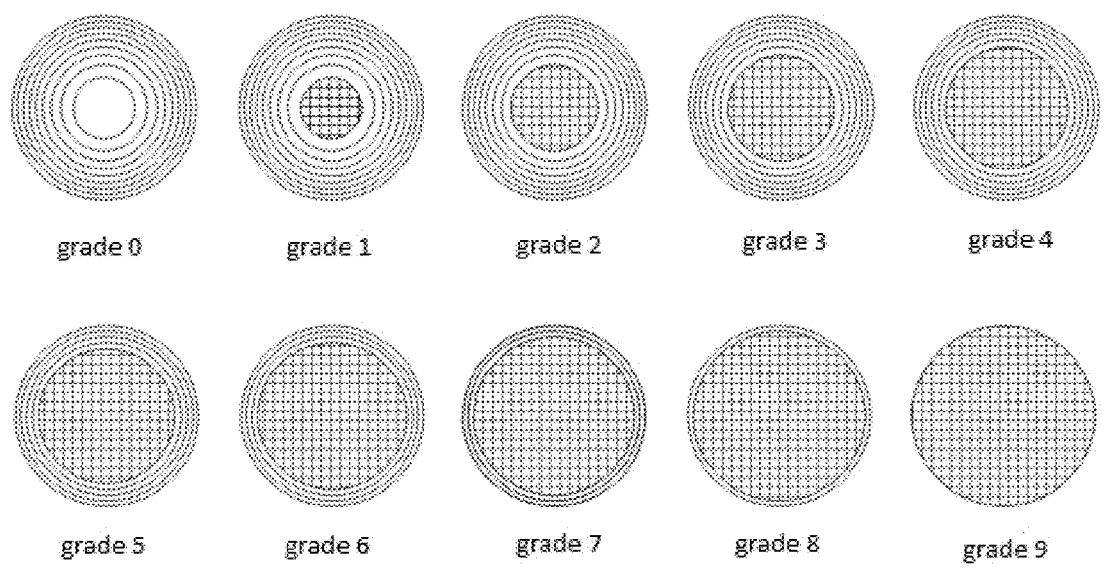
FIG. 8 is another schematic diagram illustrating nine-ring bonding grades.

As shown in FIGS. 7 and 8, from the inside to the outside, the diameter of the circle is $d_i$ (i=1, 2, . . . , 9), and the part between the two circles is an annular groove as a bonding groove, where $d_i^2 - d_{i-1}^2 = d_1^2$ (i>1), that is, each of areas of the coating formed by bonding material arranged in the annular grooves is equal. As shown in FIG. 8, the bonding grades are shown by providing different amount of bonding material to be bonded with the upper substrate block 2 from the inside to the outside, and a total of 10 grades of bonding coating are provided.

Figure 9:
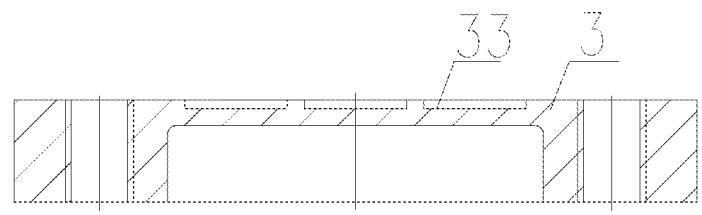
FIG. 9 is a front cross-sectional view of a nine-grid lower substrate block.
Figure 10:
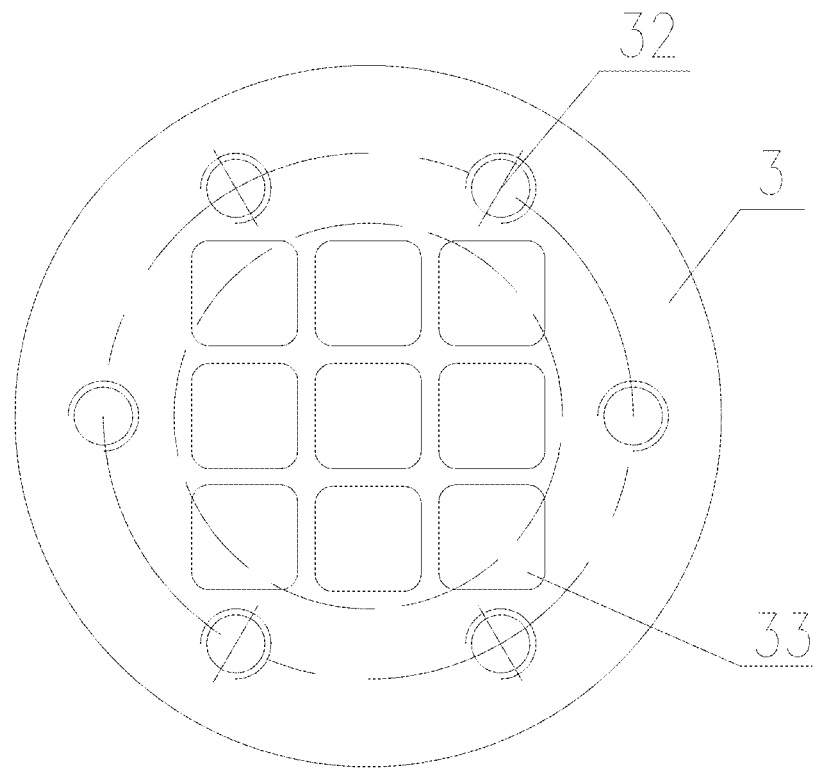
FIG. 10 is a top view of the nine-grid lower substrate block.
Figure 11:
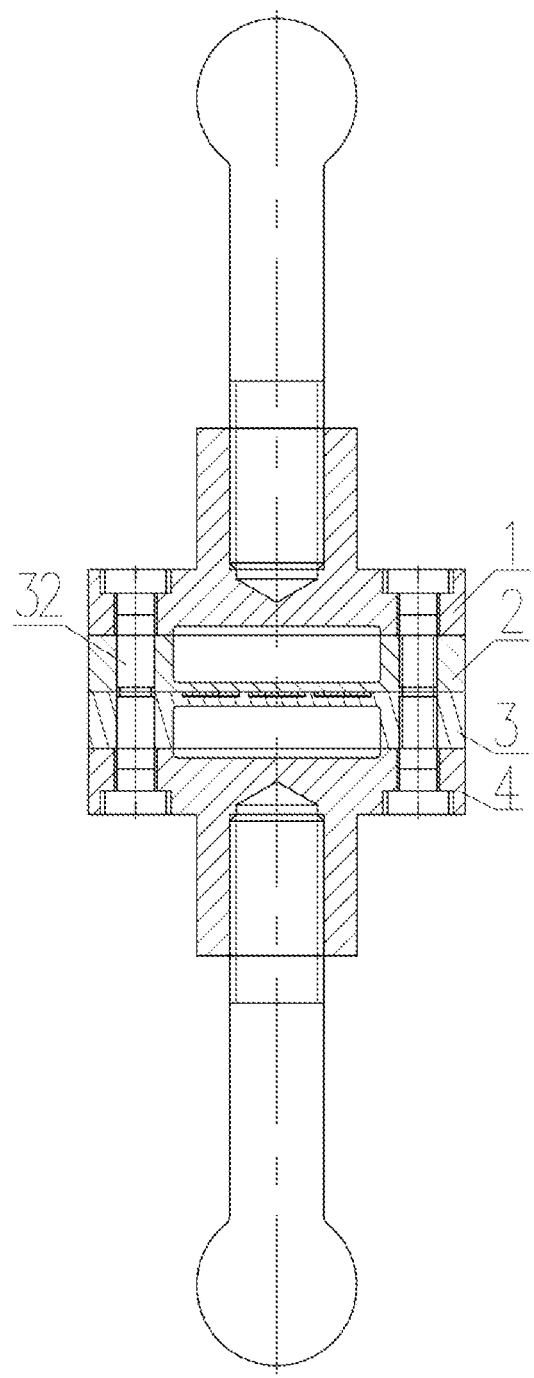
FIG. 11 is a schematic view of installation of nine-grid upper and lower substrate blocks on a tensile testing machine.
Figure 12:
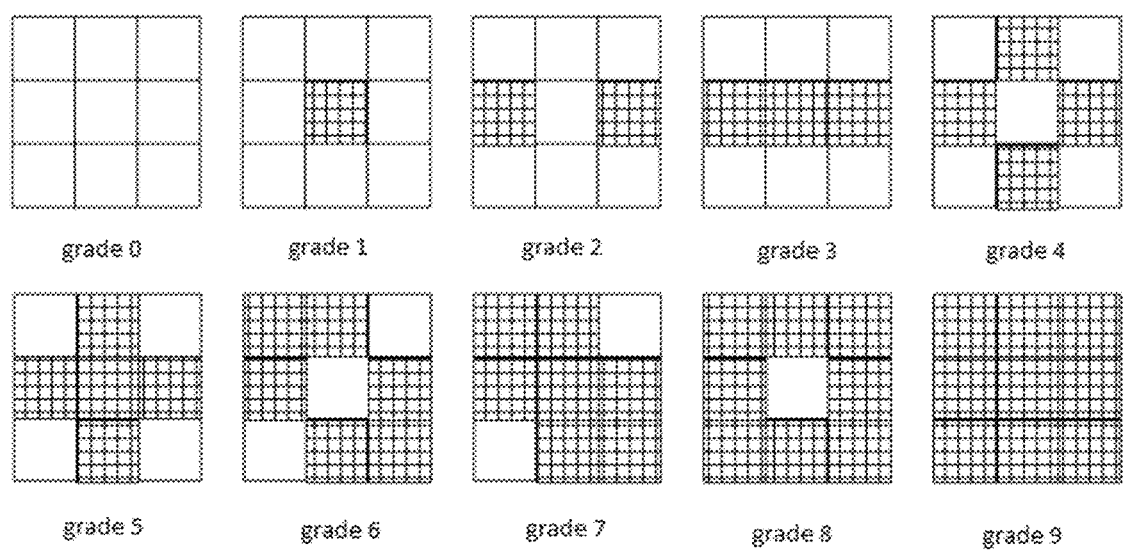
FIG. 12 is a schematic diagram of the nine-grid bonding grades.

The adhesive grooves can be quadrate grooves 33 besides annular grooves. The quadrate grooves 33 can be combined together to form a nine-grid pattern. As shown in FIGS. 9 to 11, nine quadrate grooves 33 forming an array represent grades 0 to 9, a total of 10 bonding coating grades. As shown in FIG. 12, the center of each grade of coating is arranged in the center of a quadrate nine-square grid. For example, when 6 grades of coating are adopted, adhesive materials are required to be arranged in six quadrate grooves 33, which takes the center of the nine-square grid as the center of symmetry.

When the bonding strength of the coating is detected in practice, the coating bonding strength standard in the form of the quadrate nine-square grid or the nine-ring form is selected according to whether the shape of the workpiece coating is close to quadrate or round.

Nine coating theoretical bonding strengths $\sigma_{th}$ can be obtained by setting different coating areas and applying different tensile forces, and then nine grades of coating bonding strengths $\sigma$ can be calculated using Eq.8 or Eq.9.

Assuming that the reflection coefficient $r_{S1}$ or $r_{S2}$ is zero or the minimum value and the transmission coefficient $t_{t1}$ or $t_{t2}$ is 1 or the maximum value when the ultrasonic scanning sound beam is incident, it indicates that the interface of coating layer and the adhesive layer, at the corresponding point of the ultrasonic beam is completely bonded, the ultrasonic signal energy is completely transmitted, and the bonding strength of the corresponding point is 1 or the maximum value or the theoretical value $\sigma_{th}$ at this time.

Assuming that the reflection coefficient $r_{S1}$ or $r_{S2}$ is 1 or the maximum value and the transmission coefficient $t_{t1}$ or $t_{t2}$ is zero or the minimum value when the ultrasonic scanning sound beam is incident, it indicates that debonding occurs at the interface of the coating layer and the adhesive layer at the corresponding point of the ultrasonic beam, total reflection of ultrasonic signal energy occurs, and the bonding strength of the corresponding point is zero or the minimum value at this time.

In engineering application, when a workpiece is thick, the reflection method is generally adopted to detect the bonding strength of a coating. In the case where the workpiece is thick, the transmission method, in which signals are transmitted on one side of the workpiece and are received on the other side of the workpiece, may not receive signals on the other side of the workpiece; on the other hand, the reflection method, in which signals are transmitted and received on the same side of the coating, can receive the ultrasonic signals. In addition, only the energy emission coefficient $r_{s1}$ of the interface of the coating and the adhesive layer is measured in practice, and $\sigma_{r1}$ represents the bonding strength $\sigma$ of the coating and the substrate. In actual measurements, the acoustic impedances $Z_1$ and $Z_2$ of the coating and bond coat materials are known, and the energy reflection coefficient $r_{s1}$ at the interface of the coating and bond coat is calculated according to Eq.1.

The ultrasonic detection and tensile calibration test method for the bonding strength grade includes the following steps.

In a step 1, the upper substrate block 2 and the lower substrate block 3 are respectively arranged on the tensile testing machine, wherein the upper substrate block 2 is fixedly arranged, and the upper surface of the lower substrate block 3 is provided with nine bonding grooves of the same area, and the bonding grooves are annular grooves or quadrate grooves.

The lower loading block 4 and the lower substrate block 3 are fixedly connected with each other through bolts and then are fixedly connected with the lower stretching rod of the tensile testing machine. The upper loading block 1 and the upper substrate block 2 are fixedly connected with each other through bolts 32 and then are fixedly connected with the upper stretching rod of the tensile testing machine.

In a step 2, the bonding groove(s) is bonded to the upper substrate block 2 to form a theoretical bonding area $s_{tv}$, and a downward actual tensile force is applied to the lower substrate block 3.

During the experiment, different numbers of the quadrate grooves or the annular grooves are filled with bonding materials to bond with the upper substrate block 2 to reflect different theoretical bonding areas. In case where the quadrate grooves are bonded, all of bonding quadrate grooves are ensured to be symmetrical about the center of the nine-square grid so as to meet the requirement of tensile testing along the axial center of the tensile testing machine. In case where the annular grooves are bonded, bonding from inside to outside is ensured. The tensile force at the moment is actual tensile force, and the bonding area at the moment is the theoretical bonding area.

In a step 3, the actual bonding area $S_{sj}$ of the theoretical bonding area in the step 2 is scanned by using the ultrasonic scanning method.

Using the ultrasonic microscope system, according to the detection principle of the bottom surface echo method, the tracking gate is placed on the top surface echo of the upper or lower substrate block and the data gate is placed on the bottom surface echo of the upper or lower substrate block to perform ultrasonic C-scan on the upper or lower substrate block, where peak imaging is selected as imaging mode. Effective particles at the bonding part are extracted by using Image J to obtain the particle area of the bonding surface, namely the actual bonding area.

In a step 4, a first actual bonding strength $S_{sj}$ is calculated by using the actual tensile force obtained in the step 2 and the actual bonding area $\sigma_{sj1}$ obtained in the step 3, and the first actual bonding strength $\sigma_{sj1}$ is compared with a second actual bonding strength $\sigma_{sj2}$ calculated by an equation to verify the correctness of a method that uses a theoretical bonding area as a calibrated bonding strength.

The ratio of the actual tensile force obtained in the step 1 to the actual area obtained in the step 2 is the actual bonding strength $\sigma_{sj1}$, and then the actual bonding strength is calculated through Eq.8, since the reflection method is used for verifying the situation that only energy total reflection is considered during actual verification. The upper and lower matrix blocks are made of the same material, the acoustic impedance $Z_1$ of the upper matrix block and the acoustic impedance $Z_2$ of the bonding material are known. The second actual bonding strength $\sigma_{sj2}$ is obtained by the following equation:

$$\sigma_{sj2} = \sigma_{th} \cdot K_r = \sigma_{th} \cdot \frac{\oint r_{s1} ds}{\oint r_{sth} ds} = \sigma_{th} \cdot \frac{\oint \frac{Z_2 - Z_1}{Z_1 + Z_2} ds}{\oint r_{sth} ds} = \sigma_{th} \cdot \frac{\frac{Z_2 - Z_1}{Z_1 + Z_2} \cdot s_{sj}}{s_{lv}},$$

where $s_{sj}$ is the actual bonding area of the adhesive layer, $s_{lv}$ is the theoretical bonding area of the adhesive layer, and $\sigma_{th}$ is the theoretical bonding strength of the upper substrate block that is generally obtained by a tensile test. The minimum value $\sigma_{min}$ is taken, which $$\sigma_{sj1} > \sigma_{min} \cdot \frac{\frac{Z_2 - Z_1}{Z_1 + Z_2} \cdot s_{sj}}{s_{lv}}$$

is verified to be within the allowable range.

In a step 5, the steps 2 to 4 are repeated multiple times to form a bond strength table in which the theoretical bonding areas, the actual bonding areas and the first actual bonding strengths are in one-to-one correspondence, wherein the theoretical bonding areas $s_{lv}$ and the actual tensile forces in each of the multiple times are different from those in other times.

Different actual tensile forces and different theoretical bonding areas are used for tensile testing, and ultrasonic scanning method is adopted to scan the adhesive layer to obtain the actual bonding area $s_{sj}$. In this way, several sets of data are obtained, and the bonding strength table in that the theoretical bonding areas, the actual bonding areas and the first actual bonding strengths are in one-to-one correspondence is created.

In a step 6, a C-scan is performed on the adhesive layer of a workpiece made of the same material of which bonding strength needs to measure to obtain the actual bonding area of the workpiece, and the actual bonding strength corresponding to the actual bonding area is retrieved from the bonding strength table.

In the case where the actual area of the workpiece obtained by C-scan is not equal to the actual area corresponding to the bonding area of the nine-square grid or the nine-ring form, the corresponding bonding strength can be obtained by the difference method.

This method can easily determine the bonding strength of the adhesive layer for some workpieces that are inconvenient for bonding and tensile testing in practice, without having to do additional complicated experiments to determine the bonding strength.

The two substrate blocks with different bonding strengths can be in any shape such as round, quadrate or triangular, and their materials can be aluminum alloy, low-carbon steel, composite material, non-metal material and the like. The coating material with the bonding strength can be chemical adhesives, metal or non-mental materials for hot-melt spraying, welding melting and the like.

The above are only the preferred embodiments of the present disclosure, and the scope of protection of the present disclosure should not be limited by this. It should be pointed out that a person skilled in the art may make many other improvements and changes without departing from the spirit and principle of the present disclosure, and the improvements and changes also should be regarded as falling within the scope of protection of the present disclosure.

What is claimed is:

1. An ultrasonic detection and tensile calibration test method for bonding strength grade, comprising:
   a step 1 of arranging an upper substrate block and a lower substrate block on a tensile testing machine respectively, wherein the upper substrate block is fixedly arranged, and an upper surface of the lower substrate block is provided with nine bonding grooves of the same area;
   a step 2 of bonding the upper substrate block to the bonding groove(s) to form a theoretical bonding area $s_{lv}$, and a downward actual tensile force is applied to the lower substrate block;
   a step 3 of calculating a first actual bonding strength $\sigma_{sj1}$ by using the actual tensile force in the step 2 and an actual bonding area $s_{sj}$ of the theoretical bonding area scanned by using an ultrasonic scanning method, and the first actual bonding strength $\sigma_{sj1}$ is compared with a second actual bonding strength $\sigma_{sj2}$ calculated by an equation to verify the correctness of a method that uses the theoretical bonding area as a calibrated bonding strength;
   a step 4 of repeating the steps 2 and 3 multiple times to form a bond strength table in which the theoretical bonding areas, the actual bonding areas and the first actual bonding strengths are in one-to-one correspondence, wherein the theoretical bonding area $s_{lv}$ and the actual tensile force in each of the multiple times are different from those in other times; and a step 5 of performing a C-scan on an adhesive layer of a workpiece made of the same material of which bonding strength needs to measure to obtain the actual bonding area of the workpiece, and the actual bonding strength corresponding to the actual bonding area is retrieved from the bonding strength table.

2. The method of claim 1, wherein the formula for calculating the second actual bonding strength $\sigma_{sj2}$ in the step 3 is:

$$\sigma_{sj2} = \sigma_{th} \cdot \frac{\frac{Z_2 - Z_1}{Z_1 + Z_2} \cdot s_{sj}}{s_{lv}},$$

where $Z_1$ and $Z_2$ are acoustic impedances of coating and the adhesive layer respectively, $\sigma_{th}$ is a theoretical bonding strength of the upper substrate block that is generally obtained by a tensile testing and is set as a minimum value of $\sigma_{min}$ in the testing.

3. The method of claim 2, wherein verifying the correctness of the method that uses the theoretical bonding area as the calibrated bonding strength comprises verifying whether $$\sigma_{sj1} > \sigma_{sj2} = \sigma_{min} \cdot \frac{\frac{Z_2 - Z_1}{Z_1 + Z_2} \cdot s_{sj}}{s_{lv}}$$

is within an allowable range.

4. The method of claim 1, wherein the bonding grooves are nine quadrate or annular grooves of the same area, the quadrate grooves are combined together to form a large quadrate nine-square grid, and the annular grooves are sequentially concentrically arranged from inside to outside to have a nine-ring form.

5. The method of claim 4, wherein the theoretical bonding areas of grades of the nine-square grid in the step 2 are symmetrical about a center of the nine-square grid.

6. The method of claim 1, wherein arranging the upper and lower substrate blocks on the tensile testing machine respectively in the step 1 comprises arranging the upper and lower substrate blocks on upper and lower stretching rods of the tensile testing machine respectively, where the upper stretching rod is fixedly arranged.

* * * * *